United States Patent
Wang et al.

(10) Patent No.: US 9,247,283 B1
(45) Date of Patent: Jan. 26, 2016

(54) MOSAIC PRESENTATION SCREEN PRODUCTION

(71) Applicant: Cisco Technology, Inc., San Jose, CA (US)

(72) Inventors: Jie Wang, Antony (FR); Pierre-Stéphane Diaz, Courbevoie (FR); Benoit Baudaux, Paris (FR); Alex Ruelle, Colombes (FR); Philippe Martin-Duday, Fontenay-le-Fleury (FR); Gabriel Bouvigne, Nanterre (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/524,089

(22) Filed: Oct. 27, 2014

(51) Int. Cl.
| | |
|---|---|
| *H04N 7/173* | (2011.01) |
| *H04N 21/431* | (2011.01) |
| *H04N 21/2665* | (2011.01) |
| *H04N 21/2668* | (2011.01) |
| *H04N 21/482* | (2011.01) |
| *H04N 21/462* | (2011.01) |
| *H04N 5/445* | (2011.01) |
| *H04N 21/4627* | (2011.01) |
| *H04N 21/81* | (2011.01) |

(52) U.S. Cl.
CPC ....... *H04N 21/4314* (2013.01); *H04N 5/44591* (2013.01); *H04N 21/2665* (2013.01); *H04N 21/2668* (2013.01); *H04N 21/4622* (2013.01); *H04N 21/4627* (2013.01); *H04N 21/482* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 7,231,607 B2 | 6/2007 | Neely et al. | |
| 7,668,867 B2 * | 2/2010 | Morris | G06F 17/30038 707/705 |
| 8,056,099 B2 | 11/2011 | Shanks et al. | |
| 8,402,488 B2 | 3/2013 | Craner | |
| 2004/0184548 A1 * | 9/2004 | Kerbiriou | H04N 21/2365 375/240.28 |
| 2005/0028203 A1 * | 2/2005 | Kim | H04N 5/44543 725/44 |
| 2005/0212920 A1 * | 9/2005 | Evans | H04N 5/4401 348/211.11 |

(Continued)

FOREIGN PATENT DOCUMENTS

CN      102421014      4/2012

OTHER PUBLICATIONS

Choi, Yoon-Hee et al, "Efficient Channel Navigation Using Circular Buffering Algorithm in Digital TV", IEEE Transactions on Consumer Electronics, vol. 54, No. 1, Jan. 16, 2008.

(Continued)

*Primary Examiner* — Fernando Alcon
(74) *Attorney, Agent, or Firm* — Samuel M. Katz

(57) ABSTRACT

In one embodiment, a method implemented on a computing device includes: receiving one or more video mosaic source services, each of the one or more video mosaic source services comprising a plurality of cells, each cell being associated with a content source; receiving signaling data, the signaling data comprising at least one attribute defining a current content available on a content source; receiving a request specifying an attribute to use for producing a mosaic presentation screen; and upon receiving the request, compositing cells extracted from the received one or more video mosaic source services into a mosaic presentation screen, the composited cells being associated with content sources whose current content attribute corresponds to the specified attribute.

19 Claims, 8 Drawing Sheets

(56) References Cited

U.S. PATENT DOCUMENTS

| | | | |
|---|---|---|---|
| 2005/0253966 A1* | 11/2005 | Mertens | H04N 5/142 348/553 |
| 2006/0107302 A1* | 5/2006 | Zdepski | H04N 21/23424 725/135 |
| 2007/0204297 A1* | 8/2007 | Gonzalez | H04N 5/44543 725/41 |
| 2007/0206622 A1* | 9/2007 | Houdaille | H04L 29/06027 370/431 |
| 2007/0214478 A1* | 9/2007 | Feldstein | H04N 5/44543 725/38 |
| 2007/0220546 A1 | 9/2007 | Shanks et al. | |
| 2007/0234388 A1* | 10/2007 | King | H04N 5/44543 725/39 |
| 2007/0250865 A1* | 10/2007 | Krakirian | H04N 5/44543 725/58 |
| 2008/0163059 A1* | 7/2008 | Craner | H04N 5/44543 715/719 |
| 2008/0216127 A1* | 9/2008 | Shanks | H04N 5/44591 725/67 |
| 2009/0037966 A1* | 2/2009 | Rolls | H04N 21/4622 725/105 |
| 2009/0228943 A1 | 9/2009 | Ramaswamy et al. | |
| 2010/0115554 A1* | 5/2010 | Drouet | H04N 5/44543 725/41 |
| 2010/0153885 A1* | 6/2010 | Yates | G06F 3/0482 715/841 |
| 2010/0158109 A1* | 6/2010 | Dahlby | H04N 7/17318 375/240.03 |
| 2010/0171881 A1* | 7/2010 | Castellan | H04N 5/44543 348/598 |
| 2011/0202960 A1* | 8/2011 | Vaysman | H04N 21/84 725/41 |
| 2012/0072952 A1 | 3/2012 | Vaysman et al. | |
| 2013/0179921 A1* | 7/2013 | Ma | H04N 21/63 725/39 |
| 2013/0283318 A1* | 10/2013 | Wannamaker | H04H 20/30 725/56 |
| 2014/0082661 A1* | 3/2014 | Krahnstoever | H04N 21/435 725/32 |
| 2014/0269930 A1* | 9/2014 | Robinson | H04N 21/2365 375/240.24 |

OTHER PUBLICATIONS

"MLB Extra Innings on DirecTV", Jan. 1, 2014, available on the web at: http://www.directv.com/sports/mlb.

Han, Jinsoo et al, "User-Configurable Personalized Mosaic Electronic Program Guide", IEEE Transactions on Consumer Electronics, vol. 54, No. 1, Jan. 13, 2014.

* cited by examiner

Figure 4A

| E4 | E8 |
| E3 | E7 |
| E2 | E6 | E10 |
| E1 | E5 | E9 |

| E5 | E9 |
| E4 | E8 |
| E3 | E7 |
| E2 | E6 | E10 |

| E5 | E10 |
| E4 | E9 |
| E3 | E7 |
| E2 | E6 | E11 |

| E5 | E9 |
| E4 | E7 |
| E3 | E12 | E11 |
| E2 | E6 | E10 |

(12) United States Patent
US 9,247,283 B1

MOSAIC PRESENTATION SCREEN PRODUCTION

TECHNICAL FIELD

The present disclosure generally relates to methods and apparatus to produce and display a dynamic mosaic presentation screen.

BACKGROUND

A video mosaic channel is a television channel divided into a plurality of video mosaic elements providing an end user with a split screen view of multiple source channels as they are broadcast. In common digital television (DTV) systems, one or more video mosaic channels are transmitted from a headend to multiple DTV decoder devices thereby enabling the end users to have a global view of the on-going TV programs available on different linear television channels.

Nowadays, many TV operators have started to provide different ways to customize the presentation of such video mosaic channels. Examples of video mosaic channel customization include: composing a video mosaic channel in real time on the headend side after receiving a request from a user and subsequently, delivering the composed video mosaic channel; or pre-composing on the headend side multiple theme-based video mosaic channels for later delivery.

BRIEF DESCRIPTION OF THE DRAWINGS

The present invention will be understood and appreciated more fully from the following detailed description, taken in conjunction with the drawings in which:

FIGS. 4A, 4B, 4C and 4D are simplified pictorial illustrations of an exemplary mosaic presentation screen, constructed and operative in accordance with an embodiment of the present invention;

FIGS. 5A, 5B, 5C and 5D are simplified pictorial illustrations of an exemplary mosaic presentation screen, constructed and operative in accordance with another embodiment of the present invention.

DESCRIPTION OF EXAMPLE EMBODIMENTS

Overview

In one embodiment, a method implemented on a computing device includes: receiving one or more video mosaic source services, each of the one or more video mosaic source services comprising a plurality of cells, each cell being associated with a content source; receiving signaling data, the signaling data comprising at least one attribute defining a current content available on a content source; receiving a request specifying an attribute to use for producing a mosaic presentation screen; and upon receiving the request, compositing cells extracted from the received one or more video mosaic source services into a mosaic presentation screen, the composited cells being associated with content sources whose current content attribute corresponds to the specified attribute.

DETAILED DESCRIPTION OF EXAMPLE EMBODIMENTS

Figure 1:
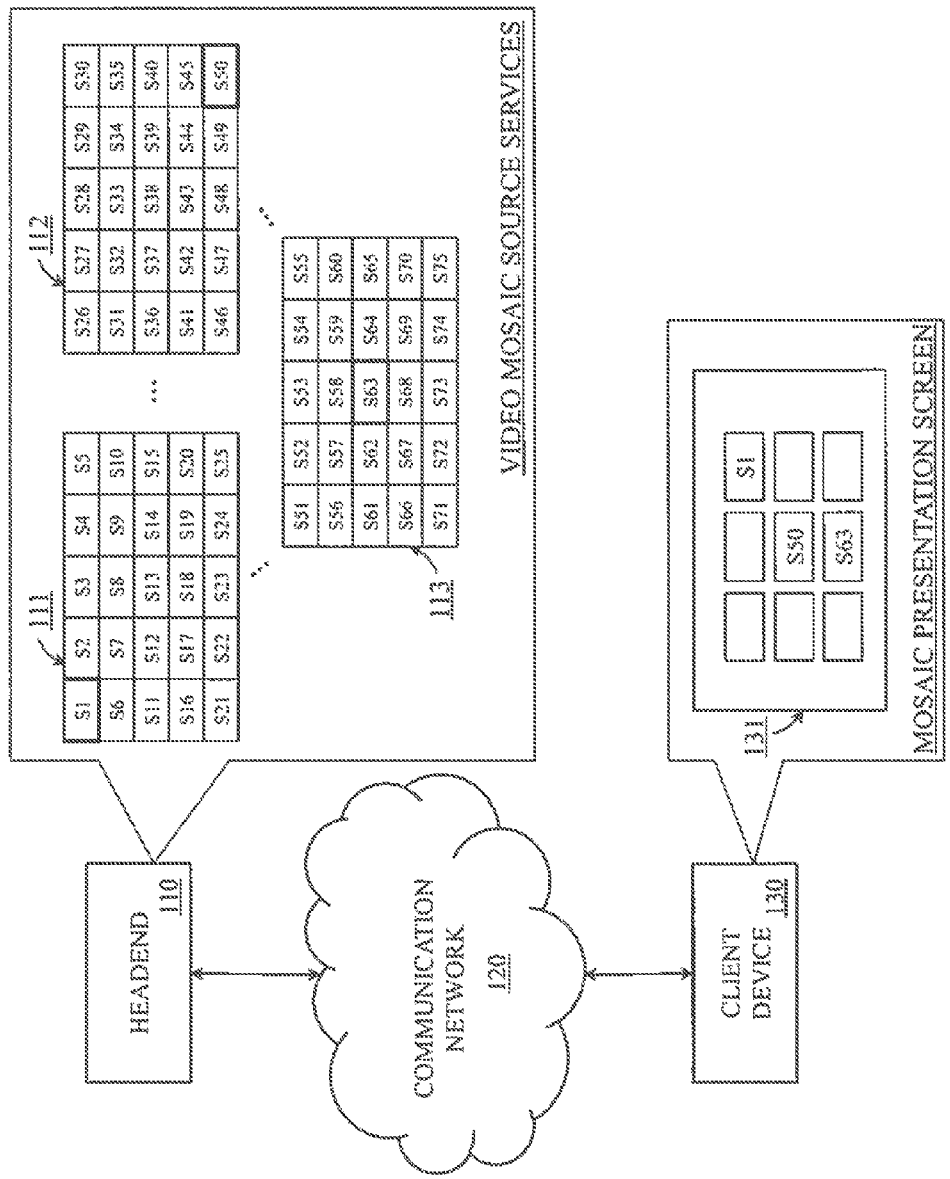
FIG. 1 is a simplified pictorial illustration of an exemplary video mosaic compositing system, constructed and operative in accordance with embodiments of the present invention.

FIG. 1, to which reference is now made, shows an exemplary video mosaic compositing system constructed and operative in accordance with an embodiment of the present invention. The system 100 of FIG. 1 comprises a headend 110, a communication network 120 and a client device 130. One or more video mosaic source services 111, 112, . . . , 113 are generated on the headend side and transmitted to client device 130 along with relevant signaling data via the communication network 120. Upon reception of the source mosaic services 111, 112, . . . , 113 and the signaling data, client device 130 is operable to produce and dynamically update a video mosaic service 131.

A headend 110 typically communicates with a plurality of client devices 130 via a communication network 120. Additionally or alternatively, a plurality of headends 110 communicates with a single client device 130 or with a plurality of client devices 130 via the communication network 120. For simplicity of depiction and description, and without limiting the generality of the present invention, only one client device 130 and one headend 110 are illustrated in the system 100 of FIG. 1.

The communication network 120 is a one-way or two-way communication network that includes at least one of the following: a satellite based communication network; a cable based communication network; a conventional terrestrial broadcast television network; a telephony based communication network; a telephony based television broadcast network; a mobile-telephony based television broadcast network; an Internet Protocol (IP) television broadcast network; a radio based communication network; and a computer based communication network. It is appreciated that in alternate embodiments of the present invention, the communication network 120 may, for example, be implemented by one-way or two-way hybrid communication network, such as a combination cable-telephone network, a combination satellite-telephone network, a combination satellite-computer based communication network, or by any other appropriate network. Other ways of implementing the communication network 120 will be apparent to someone skilled in the art.

The system of FIG. 1 includes a client device 130 that may be any type of device operable to communicate with the headend 110 via the communication network 120 and produce a video mosaic service 131. The client device 130 may be for example, but without limiting the generality of the invention, a set-top box (STB), a personal or digital video recorder (PVR and DVR), a companion device such as a laptop, a desktop or personal computer (PC), a tablet computer, a mobile computing device or any other appropriate handheld or computing device.

The headend 110 typically transmits audio video (AV) streams, metadata, signaling data and any other suitable content and/or data to the client device 130. The AV streams typically comprise a plurality of TV services (also referred as TV channels hereinafter, both terms being interchangeably used in the present application) multiplexed together at the headend 110 before transmission. Each one of the TV services is typically a sequence of TV programs under the control of a broadcaster which can be broadcast as part of a schedule. Signaling data is digital data describing the delivery system, content and scheduling/timing of broadcast AV streams, etc. It includes different service information (SI) tables and program specific information (PSI) such as, for example, NIT (Network information Table), SDT (Service Description Table), PMT (Program Map Table), PAT (Program Association Table), etc. as defined in Digital Video Broadcasting (DVB) and Moving Picture Experts Group (MPEG); Specification for Service Information (SI) in DVB systems, ETSI EN 300 468 V1.8.1, program specific information (PSI) in ISO/IEC 13818-1.

In one exemplary embodiment of the present invention, the headend 110 is further operative to generate one or more video mosaic source services 111-113. FIG. 1 shows three examples of video mosaic source services 111, 112 and 113. Each of the video mosaic source services 111-113 is typically divided into a plurality of cells providing a viewer with a split screen view of multiple source services as they are broadcast. The broadcaster, TV operator, or platform operator is typically in charge of selecting which source service to assign to which cell. Taking the example of video mosaic source service 111, twenty five cells are shown wherein:

S1 is a cell associated with source 1 (e.g. a first TV service) and shows the current content of source 1 (e.g. a "news" TV program);

S2 is a cell associated with source 2 and shows the current content of source 2 (e.g. a "documentary" program of a second TV service).; and S25 is a cell associated with source 25 and shows the current content of source 25 (e.g. a "sports" program of a third TV service).

Furthermore, it will be apparent that the cells are not limited to show TV services only. On the contrary, various types of sources and content may be shown in the video cells. For example, the cells may include VOD (Video-On-Demand) assets that can be purchased via a dedicated VOD portal; promotional videos; ads; future programs; video trailers; any type of video; still pictures; web content; local content; etc. Similarly, although depicted as an organized arrangement of twenty five cells, each of the video mosaic source services generated by the headend 110 may comprise a different number of cells. Additionally and/or alternatively, the size and/or the shapes of the cells may differ from one video mosaic source service to another or even within a single video mosaic source service. In other words, the number of video mosaic source services to generate as well as their designs and contents is customizable and under the control of the broadcaster, TV operator or platform operator.

Once generated, the one or more video source mosaic services 111-113 are encoded with the TV services and multiplexed in the AV stream for being transmitted to client device 130 via the communication network 120. Audio tracks associated with each cell of the different video mosaic source services 111-113 may be multiplexed in the same AV stream or be provided to the client device 130 in a separate stream (multiplexed or not).

In one embodiment of the present invention, traditional hardware (HW) and software (SW) components (not shown in FIG. 1) may be used on the headend side for generating each of the one or more video mosaic source services 111-113 thereby avoiding adding extra resources and/or increasing the overall cost. Furthermore, a source (linear TV service, VOD asset, promotional video, etc.) is assigned a static position in a particular video mosaic source service. Assigning a static position typically includes associating a source with a particular cell of a particular video mosaic source service with a specific source. As a result, the current content of the source is shown in the same cell on the same video mosaic source service at all times.

In another example embodiment of the present invention, an attribute of the source current content is used at the time when the one or more video mosaic source services 111-113 are generated. As a result, sources whose current content has a same or similar attribute are associated with cells located in a same area of a video mosaic source service. An attribute of content may be any appropriate type of descriptor defining a type of content. Non limiting examples of attributes are genre, sub-genre, category (e.g. linear or regular TV service, VOD asset, recorded TV program, ads, etc.), nature (e.g. picture, text, video, etc.), etc. of the contents. It will be apparent to someone skilled in the art that these attributes may be dynamic in the sense that they may change over time. For example, in the video mosaic source service 111, S1 is a cell representing a TV service. According to this TV service broadcast schedule, a genre attribute of the current TV program (e.g. a "news" TV program) may be different from the genre of the following TV program (e.g. a "documentary" TV program). In such a situation, the video mosaic source service 111 has to be updated to reflect this change. Therefore, in this example embodiment of the present invention, the one or more video mosaic source services 111-113 are updated whenever a change in the current content attributes is identified. Updating a video mosaic source service typically includes dynamically modify the source/cell associations according to a change in the current content.

The headend 110 is further operative to generate and deliver the appropriate relevant signaling data to client devices 130 via the communication network 120. Different signaling data is made available to enable client devices 130 to produce a mosaic image stream 131 (hereinafter referred as mosaic presentation screen 131 for sake of clarity).

The signaling data may include data signaling the video mosaic source services. This may be achieved, for example, via the existing signaling system (e.g. SI tables) or a newly dedicated one. In both cases, the video mosaic source services may be signaled as a special type of service in order to be differentiated by client devices 130 from the other services (potentially including concurrent or co-existing legacy mosaic service(s)) present in the transmitted AV stream. Although the video mosaic source services 111-113 are used for producing the mosaic presentation screen 131 on client devices 130 and therefore are not intended to be visible to the end users, the broadcaster, TV or platform operator may signal those services as a regular TV service visible to the end users;

Also, the signaling data may include data specifying the composition of each of the video mosaic source service. This may be achieved, for example, via the existing signaling system (e.g. SI tables) or a newly dedicated one. In both cases, data for each cell of each video mosaic source services will be signaled. Typically, this signaling data may include at least position, size, link to the current source service and links to audio tracks of the current source service for each cell. Those skilled in the art will appreciate that any other appropriate data may be included in this composition signaling data. For example, usage confirmation data may also be provided for each cell indicating a default parental rating, a default genre in case of the absence of dynamic current content information, groups of users allowed for viewing, user profiles allowed for viewing, regions allowed for viewing, etc. Further, this signaling may be dynamic i.e. updated regularly to reflect changes in the composition of the different video mosaic source services. For example, when the video mosaic source services are updated, new composition signaling data may be generated to reflect the updated composition of the video mosaic source services;

Further, the signaling data may include data specifying the attribute(s) of the current content for each cell of each video mosaic source service. This signaling may be real time or near real time in order to reflect the attribute(s) of the source current contents. In a situation where a cell is properly synchronized with a source service (e.g. follows a pre-defined schedule of a TV service), there may be no need for additional signaling since the attribute(s) of this content may be retrieved from the existing signaling data. Typically, the attribute(s) of the current content may be retrieved, for example, from the EIT p/f (Event Information Table past/following). However, the broadcaster, TV or platform operator may want a more flexible attribute classification signaling. Indeed, more refined attribute definitions may be specified such as, for example, but without limiting the generality of the present invention, "most viewed", "first broadcast", "recommended", "favorites", "most booked", etc. or even any other suitable keywords relevant to a particular type of content. In this case, new signaling data may be generated by the headend 110 to specify the additional attributes. Therefore, depending on the configuration designed by broadcaster, TV or platform operator, the headend 110 is operative to either: use existing data signaling; generate new signaling data; or combine existing and newly generated data to specify the attribute(s) of the current content in each cell of each video mosaic source service. In a further example embodiment of the present invention, this signaling data may be customized to accommodate different users or groups of users.

Finally, the signaling data may include data relevant to the use of the mosaic presentation screen. Typically, the broadcaster, TV or platform operator may be able to restrict the use of the mosaic presentation screen by sending usage configuration data to client devices 130. This usage configuration data may be specific to a particular user (or a particular client device 130) or to a group of users (respectively a group of client devices 130) and may include some constraints limiting the use of the mosaic presentation screen. Non-limiting examples of such constraints may include: restricting the use depending on geographical or regional factors; restricting the use until the end user has subscribed to a service or a bouquet of services; restricting the use until the end user has purchased a related product; adult or parental control restrictions (e.g. protecting access to adult or parental protected contents by PIN code, etc.); allowing the use only during certain timeslots or durations for one or more source services; allowing the use only in combination with ads and/or promotional content display; allowing/limiting the use depending on a user profile; etc.

The choice of reusing existing signaling data and/or generating new signaling data is a trade-off between performance, cost, flexibility, etc. factors and is therefore under the control of the broadcaster, TV or platform operator. Similarly, the way the signaling data is provided to client device 130—separately and/or some or all combined—is left to the broadcaster, TV or platform operator. In one embodiment, a configuration data file, such as an XML (eXtensible Markup Language) file, is generated and typically includes some or all of the above signaling data. Then, the XML file may be transmitted by the headend 110 to client device 130 along with the AV stream and metadata. An exemplary XML configuration data file is given below:

```
<channel-list>
<!--Channel 1-->
<channel service="dvb://010B.005C.5D01" mosaic="1"
    video="0,0,213,120"       audio="00,01,02"
    criteria="auto"/>
<!--Channel 2-->
<channel service="dvb://010B.005C.5D02" mosaic="1"
    video="213,0,213,120"     audio="04,05,06"
    criteria="auto,popular,news"/>
<!--Channel 3-->
<channel                      service="http://145.56.210.95/
    channelabc.m3u8" mosaic="1" video="426,0,213,120"
    audio="07,08" criteria="sports"/>
<!--Channel 4-->
<channel service="rtsp://145.56.210.100:80/stream.sdp"
    mosaic="1"   video="640,0,213,120"   audio="09,0A"
    criteria="recommended"/>
<!--Channel 5-->
<channel service="dvb://010B.005C.5D05" mosaic="2"
    video="853,0,213,120"     audio="10,11,12,13,14"
    criteria="auto" allowed="Region 1"/>
<!--Channel 6-->
<channel service="dvb://010B.005C.5D06" mosaic="2"
    video="1066,0,213,120"    audio="15,16,17"
    criteria="auto"/>
<!--Channel 7-->
<channel service="dvb://010B.005C.5D07" mosaic="2"
    video="0,120,213,120"     audio="B0,B1,B2"
    criteria="auto"/>
</channel-list>
```

In this XML configuration data file, "Channel 1" represents a TV service identified by its DVB triplet (010B.005C.5D01). This TV service is shown on the video mosaic source service "1" and the corresponding cell is located at the coordinates (0;0) on this video mosaic source service. Typically, the (0;0) coordinates corresponds to the top left corner. The size of the corresponding cell is also given: 213 pixels in width and 120 pixels in height. Furthermore, the TV service is associated with the audio streams "0x00", "0x01" and "0x02". Finally, an attribute of the TV service may automatically ("auto") be retrieved from the automatic classification provided as part of the EIT.

Similarly, "Channel 2" is another TV service having its own properties (DVB triplet, video mosaic source service, cell location and size as well as audio tracks). An attribute for "Channel 2" may also be retrieved using the automatic classification. Further, "Channel 2" also uses an editorial classification showing two additional attributes: "popular" and "news". Consequently, three attributes for the corresponding current content shown in the cell are available: "popular", "news" and a last one retrieved from the EIT ("auto").

The remaining portion of the XML file is deemed to be self-explanatory in light of the above description and therefore is not described hereinafter. However, it is to be noted that "Channel 3": represents an HTTP live stream associated with an Internet Protocol (IP) network Uniform Resource Identifier (URI) and uses an editorial classification ("sports"). Also, "Channel 4" represents a Real Time Transport Protocol stream associated with an IP network URI. Further, "Channel 5" is only allowed to be viewed in "Region 1". Finally, the XML file indicates that channels 1 to 4 belong to the video mosaic source service "1" whereas channels 5 to 7 belongs to the video mosaic source service "2".

The video mosaic source services 111-113, metadata and signaling data may be transmitted to client device 130 via broadcast, multicast or unicast. Then, client device 130 uses the signaling data to identify and decode the relevant video source services 111-113. Further, client device 130 generates locally a mosaic presentation screen 131 using the decoded relevant video source services 111-113. Typically, client device 130 is operative to select one or more cells from the decoded video mosaic source services to produce the mosaic presentation screen 131. As shown in FIG. 1, client device 130 may select:

- cell S1 associated with a first source (described hereinabove as a first TV service) from the video mosaic source service 111;
- cell S50 associated with a second source (a VOD asset for instance) from the video mosaic source service 112;
- cell S63 associated with a third source (another TV service for instance) from the video mosaic source service 113; and
- any other relevant cell associated with a further source from one of the video mosaic source services 111-113.

Then, client device 130 is operative to produce the mosaic presentation screen 131 using the selected cells (i.e. including at least the cells S1, S50 and S63) for display to an end user. Therefore, different customized mosaic presentation screens may be provided to different end users or groups of end users by locally processing video mosaic source services 111-113 transmitted from the headend 110. Typically, an end user of client device 130 may trigger the production of a mosaic presentation screen 131 by selecting a particular content attribute for display. For example, the end user may want to view a sports program and therefore requests client device 130 to display some or all of the available sports programs. In response, client device 130 may identify all the sources whose current content attributes include "sports". Further, usage confirmation data may also be taken into consideration to filter the sources (whose current content includes "sports") the end user is allowed to view according to his profile, region, group of users, etc. Then, the relevant video mosaic source services (i.e. the ones including at least one of such identified sources) may be decoded. Subsequently, a mosaic presentation screen 131, presenting the identified sources, is produced using the decoded relevant video mosaic source services.

Further, client device 130 is operative to update the produced mosaic presentation screen 131 under certain circumstances: upon receiving new signaling data and/or new video mosaic source services; upon detecting that a TV program has ended and/or started; upon receiving a user's input selecting a new attribute for display; etc. Continuing with the example given in the previous paragraph, a "sports" program may finish and there is therefore a need to remove the corresponding source from the mosaic presentation screen 131. In such a situation, the mosaic presentation screen 131 may be updated so that the source associated with the program is removed and does not appear any longer within the produced mosaic presentation screen 131. Conversely, a "sports" program may start and there will be therefore a need to add the corresponding source on the mosaic presentation screen 131. In such a situation, the mosaic presentation screen 131 may be updated so that the source associated with the program is inserted and therefore does appear in the produced mosaic presentation screen 131.

Figure 2:
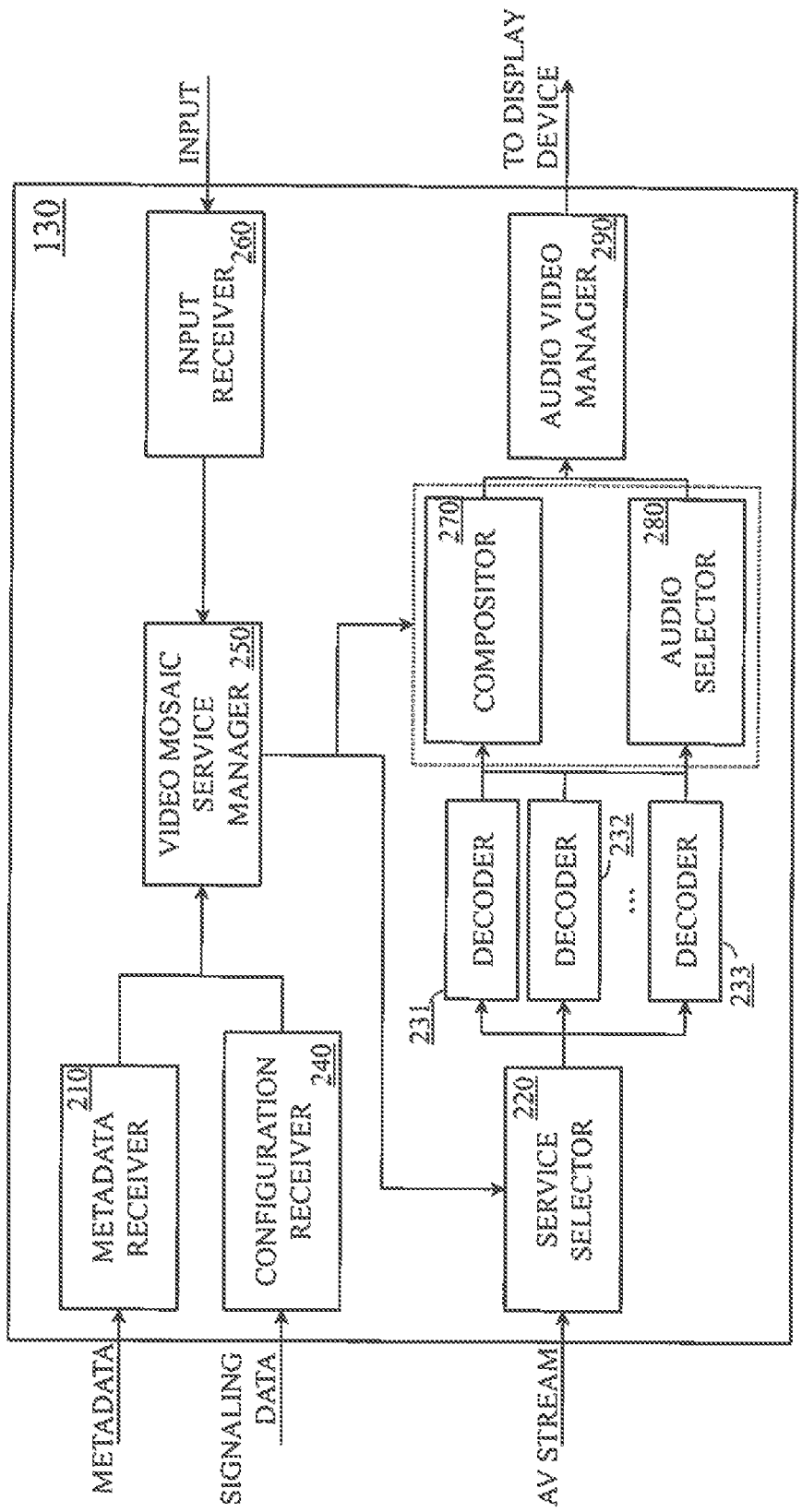
FIG. 2 is a simplified pictorial illustration of an exemplary client device, constructed and operative in accordance with an embodiment of the present invention.

Reference is now made to FIG. 2 which is a simplified pictorial illustration of a client device, constructed and operative in accordance with an embodiment of the present invention. Client device 130 typically comprises a metadata receiver 210, a service selector 220, one or more decoders 231-233, a configuration receiver 240, a video mosaic service manager 250, an input receiver 260, a compositor 270, an audio selector 280 and an AV manager 290. Those skilled in the art will appreciate that client device 130 comprises HW and/or SW components, such as are well-known in the art. It will similarly be appreciated that client device 130 is not limited to the particular arrangement shown in FIG. 2. On the contrary, client device 130 may comprise other components that are not depicted in FIG. 2.

Client device 130 typically receives from the headend 110: the AV stream, including the video mosaic source services 111-113, at the service selector 220 (e.g. one or more tuners associated with one or more demultiplexers); metadata at the metadata receiver 210; and signaling data at the configuration receiver 240. The signaling data may be stored in a storage unit (not shown) part of the configuration receiver 240 or client device 130 and updated when new signaling data is provided by the headend 110. Upon receiving the signaling data at the configuration receiver 240, the video mosaic service manager 250 is operable to locate the one or more generated video mosaic source services 111-113 in the AV stream and pass the information to service selector 220. Also, the signaling data relevant to the current content of each source may be retrieved and the video mosaic service manager 250 may extract the available attributes. Typically, a User Interface (UI) screen listing some or all of the extracted attributes may be displayed on a display device associated with client device 130 so that an end user can select one of them for producing a mosaic presentation screen 131. For example, a user may be presented a UI screen with a list of available attributes such as "news", "sports", "popular", "most booked", "VOD", etc. In response, the end user may select at least one of the attributes (e.g. "sports") thereby requesting the client device 130 to produce a mosaic presentation screen 131 typically including some or all of the sources whose current content attribute comprises "sports". The end user's selection is received by the input receiver 260 and passed to the video mosaic service manager 250. It will be appreciated by those skilled in the art that the present invention, in embodiments thereof, is not limited to an end user request for producing the mosaic presentation screen 131 at client device 130. On the contrary, other ways of triggering the production of the mosaic presentation screen 131 may include: receiving a headend request, producing automatically a mosaic presentation screen 131 based either on a default attribute or based on an end user and/or a group profile, etc. Other ways of triggering the production of the mosaic presentation screen 131 will be apparent to those skilled in the art.

Upon receiving a request to produce a mosaic presentation screen 131, the video mosaic manager 250 is operative to determine which attributes to use for producing the mosaic presentation screen 131. The received request is associated with at least one selected or default attribute but more than one attribute may be required to produce the mosaic presentation screen 131 depending on the implementation design. Indeed, the broadcaster, TV or platform operator typically specifies a layout defining how the sources are to be displayed on the produced mosaic presentation screen. Non-limiting examples of pre-defined layouts are depicted on FIGS. 3A, 3B and 3C and will be described later in further details.

Then, for each attribute that is to be displayed on the mosaic presentation screen 131, the video mosaic manager 250 determines the candidate sources using the signaling data and/or the configuration data file. A candidate source is a source whose current content has an attribute corresponding to the attributes to be displayed and that the end user is allowed to view according to his profile, region or group of users. Determining the candidate sources is achieved using the data signaling the attribute(s) of the current content in each source as well as the data signaling the composition of each of the video mosaic source services. Alternatively, the configuration file data may be parsed to identify the matching attributes and determine the candidate sources. Then, other attributes may be used to filter the sources that the end user is not allowed to view.

Once the candidate sources are determined, the video mosaic manager 250 is further operative to identify the video mosaic source services 111-113 on which the candidate sources are shown. This is typically achieved using the data signaling the composition of each of video mosaic source service (e.g. link to source service). Alternatively, the configuration file data may be parsed to identify the video mosaic source service corresponding to each of the candidate sources. As a result, the video mosaic manager 250 may instruct the service selector 220 to tune and demultiplex the video mosaic source services from the AV stream. The demultiplexed video mosaic source services are then passed to the decoders 231-233 for further processing. Typically, the video mosaic manager 250 is further operative to allocate one or more decoders 231-233 for decoding the demultiplexed video mosaic source services.

The decoded video streams are received by the compositor 270 which is then operable to produce the mosaic presentation screen 131 under the control of the video mosaic manager 250. Similarly, the decoded audio streams are received and stored at the audio selector 280. The video mosaic manager 250 typically instructs the compositor 270 which cells from the decoded video mosaic source services to use for producing the mosaic presentation screen 131. This is achieved by using the signaling data specifying the coordinates and sizes of the different cells. As a result, the compositor 270 typically comprising a GPU (Graphics Processing Unit) is able to locate and extract the relevant cells from the decoded video mosaic source services and composite them according to the relevant implementation design thereby producing the mosaic presentation screen 131. Additionally, the signaling data specifying the use of the mosaic presentation screen may be taken into consideration to produce the mosaic presentation screen 131. For example, timeslots restrictions and/or regional, subscription, or parental control constraints may be applied to determine whether or not the cells should be included and/or made visible to the end user. Also, graphics assets may be provided and used by the compositor 270 at the time when the mosaic presentation screen is produced. Indeed, the broadcaster, TV or platform operator, may provide an implementation design or layout that comprises graphics assets (e.g. textual assets, still pictures, logos, etc.) to be combined with the cells of the requested mosaic presentation screen. Therefore, a storage device (not shown) may comprise all these graphics assets and the video mosaic manager 250 may instruct the compositor 270 to retrieve the relevant graphics assets at production time. Once produced, the mosaic presentation screen 131 is sent to the AV output manager 290.

The AV output manager 290 typically transmits the mosaic presentation screen 131 to a display device thereby enabling the end user to view and interact with it. Further, the output manager 290 associates the mosaic presentation screen 131 with a relevant audio stream that is played. For example, when the end user navigates through the cells of the mosaic presentation screen 131, a visual indication indicates which cell has the focus. The output manager 290 is therefore operable to retrieve, from the audio selector 280, the audio stream associated with the focused cell and plays it. In a case where multiple audio streams are available for the same cell, the video manager 250 typically instructs the decoders 231-233 which audio stream to decode and the audio selector 280 which one is to be played. For example, the video manager 250 may instruct the audio selector 280 to play: the audio stream associated to the cell in a situation where only one audio stream is available; one particular audio stream based on a particular criterion (e.g. the current selected end user language) in a situation where multiple audio streams are available; or the audio stream associated with the target source.

Figure 3A:
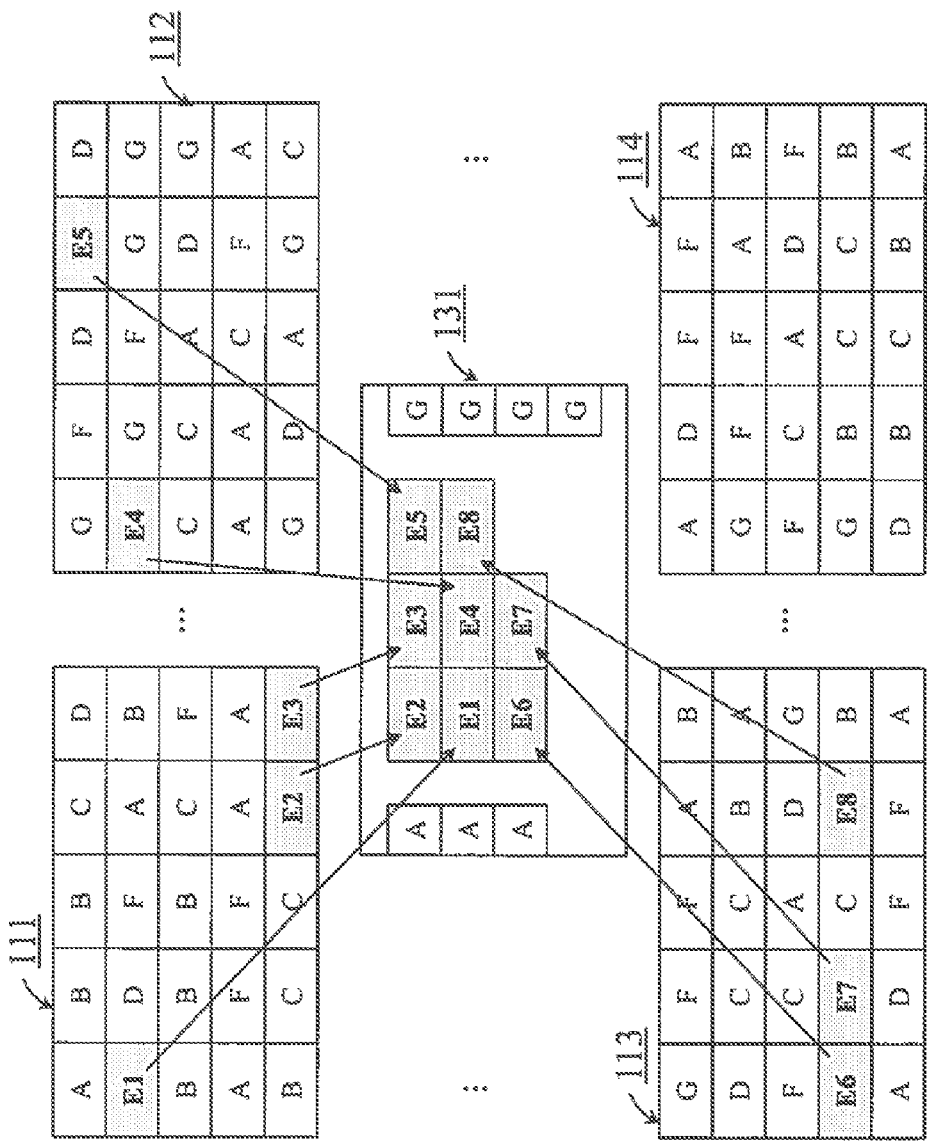
FIGS. 3A, 3B and 3C are simplified pictorial illustrations of exemplary mosaic presentation screen produced using video mosaic source services, constructed and operative in accordance with embodiments of the present invention.
Figure 3B:
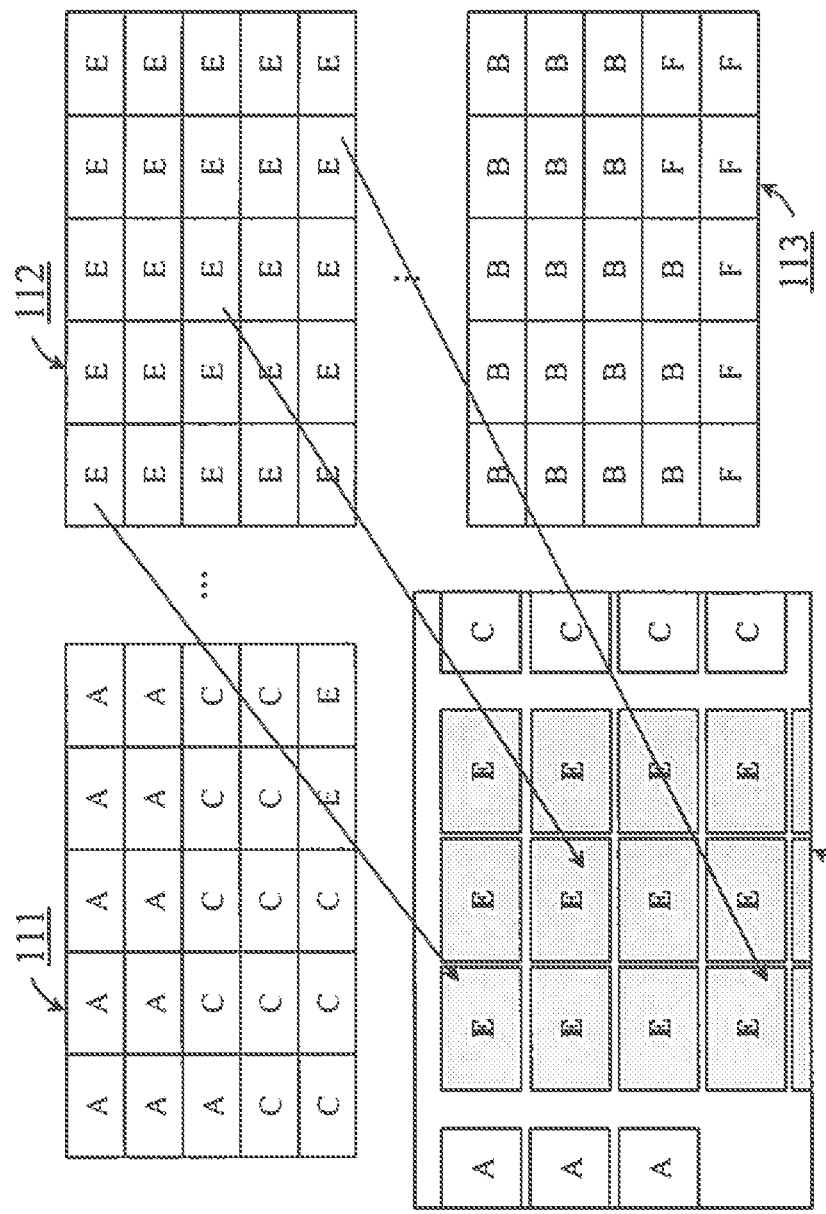
Figure 3C:
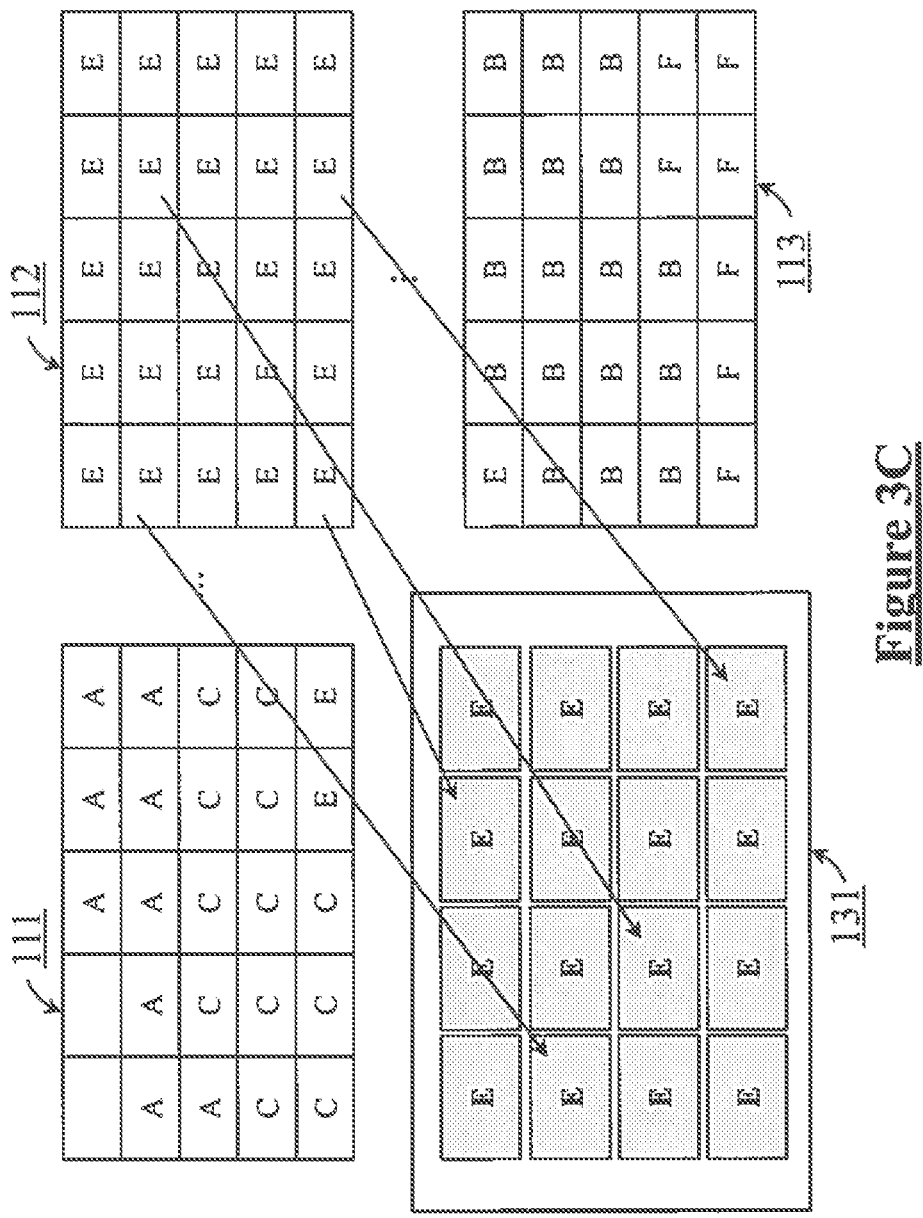

Reference is now made to FIGS. 3A to 3C which are simplified pictorial illustrations of exemplary video mosaic source services and mosaic presentation screens, constructed and operative in accordance with embodiments of the present invention. In FIGS. 3A to 3C, three or four video mosaic source services 111, 112, 113 and 114 comprising twenty five cells are generated by the headend 110 and transmitted to client device 130 as a regular TV service within the AV stream. However, it will be apparent to those skilled in the art that the present invention in embodiments thereof is not limited to this particular configuration. Indeed, more or less video mosaic source services may be generated by the headend 110 and transmitted to client device 130. Similarly, the video mosaic source services may comprise more or less cells of different sizes.

FIG. 3A depicts four exemplary video mosaic source services 111, 112, 113 and 114. FIG. 3A typically illustrates the static delivery option in which the source is assigned a static position that is to say a particular cell of a particular video mosaic source service. Therefore, each cell of the different video mosaic source services 111-114 represents a single source, such as a linear TV channel, a future TV program, a VOD asset, or any kind of link pointing to a network address (e.g. an internet website), etc. Furthermore, in FIG. 3A, each cell is marked with a letter (A, B, C, D, E, F or G) which illustrates the attribute of the current content of the source. For example, A may indicate that the current content shown within this cell is associated with a "most booked" attribute; B may indicate that the current content is associated with a "news" attribute; and E (including E1 to E8) may indicate that the current content is associated with a "sports" attribute. Furthermore, as explained hereinabove in relation with the configuration data file, a cell may be associated with more than one attribute. Therefore, C may represent a group of attributes such as, for example, "documentary", "popular" and "first broadcast". It will be apparent to someone skilled in the art that D, F and G typically represent further attributes or group of attributes.

An end user may request client device 130 to produce a mosaic presentation screen 131 including some or all of the sources whose current content has "sports" as an attribute (attribute E). Upon receiving the end user's request via the input receiver 260, the video manager 250 identifies the candidate sources using the signaling data. Then, video mosaic source services 111, 112 and 113 are identified as comprising candidate sources and are therefore decoded by the decoders 231-233. On the contrary, video mosaic source service 114 is not decoded since none of its sources is identified as a candidate source (i.e. none of them has a current content associated with an E attribute). Then, the video mosaic manager 250 uses the signaling data to identify which cells to extract and passes the information to the compositor 270. As a result, a plurality of cells E1 to E8 are identified and the compositor 270 is able to composite the E1 to E8 cells into a mosaic presentation screen 131.

FIG. 3B depicts three exemplary video mosaic source services 111, 112 and 113 and typically illustrates the dynamic delivery option. The mosaic production process is similar to the one described in relation to FIG. 3A. However, with the dynamic delivery option, sources whose current contents have a similar or same attribute are grouped together i.e. placed next to each other in the generated one or more video mosaic source services 111, 112 and 113. For example, the cells of video mosaic source service 111 are only relevant to attributes A (e.g. "most booked"), B (e.g. "news") and E (e.g. "sports"). Similarly, video mosaic source service 112 includes only sources whose current contents are associated with attribute E. Therefore, upon receiving the end user's request for displaying some or all of the sources whose current contents have attribute E, only the video mosaic source services 111 and 112 have to be decoded and processed to produce the mosaic presentation screen 131 thereby reducing the processing workload on client device 130. Indeed, only two decoders, for instance decoders 231 and 232, will be used for decoding the video mosaic source services 111 and 112. In one exemplary embodiment of the present invention, the remaining available decoding capabilities (e.g. decoder 233) may be used to proactively decode video mosaic source services (e.g. video mosaic source service 113 in this example) that are not showing identified candidate sources. In a situation where the end user's inputs a new request (e.g. to show all sources whose currents is associated with attribute B instead of attribute E), the time to produce the newly requested mosaic presentation screen 131 is reduced since the video mosaic source service 113 is already decoded and ready to be processed by the compositor 270.

FIG. 3C depicts three exemplary video mosaic source services 111, 112 and 113 and shows a layout for the mosaic presentation screen 131 different from the ones shown in FIGS. 3A and 3B. As explained hereinabove, the layout for the produced mosaic presentation screen 131 is typically configurable and under the control of the broadcaster, TV or platform operator. In other words, a pre-defined layout defining the video wall composition is used at the time when the video wall is produced. Typically, the cells associated with content sources having a same attribute are grouped together as shown on FIGS. 3A to 3C.

FIG. 3C depicts a mosaic presentation screen 131 showing only the sources relevant to the requested attribute. On the contrary, FIGS. 3A and 3B depict a mosaic presentation screen 131 produced for a first attribute (attribute E) but also comprising some sources whose current contents are associated with other attributes: three cells on the left side associated with attribute A and four cells on the right side associated with attribute G (attribute C for FIG. 3B). Showing such sources whose current contents associated with further attributes typically enables the end user to know which other attributes are available and accessible when browsing the mosaic presentation screen 131. The choice of the further attributes to display on the produced mosaic presentation screen 131 may be based on different (or a combination of) factors such as, but not limited to:

attributes the most relevant to the end user based on his profile and/or history;
attributes the most relevant to a group of users;
attributes the most similar to the one selected by the end user;
attributes including promoted or VOD contents;
attributes adjacent (in the decoded video mosaic source services) to the one selected by the end user; etc.

Further attributes may correspond to sources belonging to a video mosaic source service already decoded thereby avoiding any additional workload on the client device 130.

Reference is now made to FIGS. 4A, 4B, 4C and 4D which are simplified pictorial illustrations of exemplary mosaic presentation screen screens, constructed and operative in accordance with embodiments of the present invention. FIGS. 4A to 4D typically illustrate different situations in which the mosaic presentation screen 131 is dynamically updated. Client device 130 is operative to update the produced mosaic presentation screen 131 under certain circumstances e.g. when new signaling data are received; when new video mosaic source services are received; upon detecting that a current content has ended and/or started; upon receiving a user's input selecting a new attribute for display; etc.

FIG. 4A depicts a mosaic presentation screen 131 comprising ten cells (E1-E10) showing sources whose current contents are associated with attribute E. Client device 130 is typically operative to detect that the current content of E1 is about to finish. For example, the video mosaic manager 250 is typically able to detect that a football game shown in E1 is about to finish and, using the EITp/f for instance, that the next program on this source is not associated with attribute E. As a result, when the football game finishes, the mosaic presentation screen 131 produced by the compositor 270 is updated to reflect this change. The E1 cell is removed from the mosaic presentation screen 131 and the other cells are rearranged as shown on FIG. 4B. Alternatively, the cell E1 may not be removed but instead the content of cell E1 may be updated to reflect that the football game has finished. For example, an alternative representation, such as a logo of the corresponding source, a still picture, etc., may be displayed in E1.

Similarly, the video mosaic manager 250 may be operative to detect that the current content shown in cell E8 in FIG. 4B is about to finish and again, that the next program on this source is not associated with attribute E. Alternatively, or additionally, video manager 250 may be further operative to detect that a new content E11 is about to start and therefore, needs to appear on the mosaic presentation screen 131. Therefore, the video manager 250 updates the mosaic presentation screen 131 as shown in FIG. 4C by: removing cell E8; rearranging the positions of cells E9-E10; and inserting cell E11.

FIG. 4D depicts another example of dynamically updating the mosaic presentation screen 131 by inserting cell E12 corresponding to a new current content associated with attribute E. The layout, including the cell arrangement, may be under the control of the broadcaster, TV or platform operator. Typically, the cells are arranged by end times (e.g. E2 having an end time later than E3 and so on) so that the first cells to be removed are the ones at the bottom of the mosaic presentation screen 131. This is useful to improve the end user visual experience so that he will not be perturbed by recurrent dynamic update of the mosaic presentation screen 131. However, other ways of (re-)arranging the cells will be apparent to those skilled in the art. Non-limiting examples include (re-)arranging cells: by start times (e.g. E12 starting earlier than E7 but later than E6); by end times (e.g. E12 finishing later than E6 but earlier than E7); based on the end user's profile or history (e.g. E12 is more relevant to the end user than E7 but less than E6); and/or based on any other suitable criteria or ranking (e.g. E2-E6 may be premium content that have to appear first; E12 may be a VOD asset promoted by the broadcaster; E7 and E9 may be recorded content; and so on).

Reference is now made to FIGS. 5A, 5B, 5C and 5D, which are simplified pictorial illustrations of exemplary mosaic presentation screen screens, constructed and operative with embodiments of the present invention. FIGS. 5A to 5D typically illustrate the use of the signaling data specifying the use of the mosaic presentation screen.

Figure 5A:
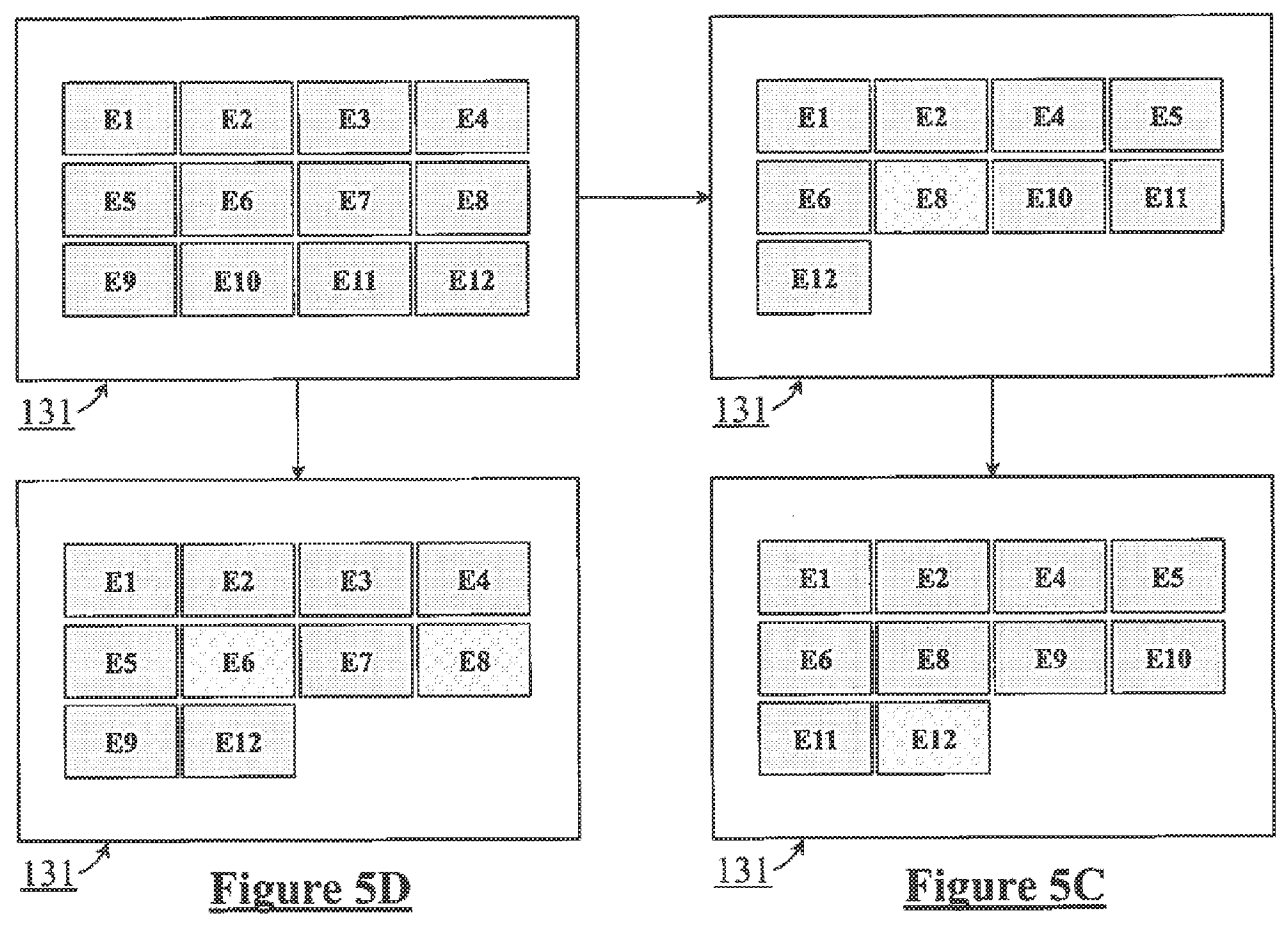

FIG. 5A depicts an exemplary mosaic presentation screen 131 being produced based on attribute E. The mosaic presentation screen 131 comprises twelve cells (E1-E12) showing sources whose current contents are associated with attribute E. However, the broadcaster, TV or platform operator is able to restrict the use of the mosaic presentation screen service by sending usage configuration data to client devices 130. This usage configuration data may be specific to a particular user (or a particular client device 130) or to a group of users (respectively a group of client devices 130) and may include some constraints limiting the use of the mosaic presentation screen. Non-limiting examples of such constraints may include: restricting the use to a specific geographical or regional area; restricting the use until subscription or purchase of a related product; adult or parental control restrictions (e.g. protecting access to adult or parental protected contents by PIN code, etc.); allowing the use only during certain timeslots or durations for one or more TV services; allowing the use only in combination with ads and/or promotional content display; allowing/limiting the use depending on a user profile; etc.

FIG. 5B depicts an exemplary mosaic presentation screen 131 based on attribute E and produced for display to a first end user. The mosaic presentation screen 131 includes the same cells E1-E2, E4-E6, E8, and E10-E12 as the ones depicted in FIG. 5A. However, E3, E7 and E9 are missing. Using the signaling data restricting the use of the mosaic presentation screen, the video manager 250 may have instructed the compositor 270, for example, to not include:

E3 because the first end user was not identified as part of a first group of users allowed to view E3;

E7 because the first end user was located in a first region where E7 is not broadcasted and/or allowed for viewing; and E9 because E9 is not allowed to be viewed during the current timeslot.

Also, E8 is shaded to illustrate that the source cannot be seen by the first end user. This may be achieved by altering the display or masking the source such as, for example, by displaying a black screen, displaying a visual indication of the TV service or content (e.g. logo, still picture, frozen video frame, trademark, etc.), displaying a degraded version of the source, etc. Although included in the mosaic presentation screen, E8 may require a further input to be viewed such as the first user entering a PIN code (e.g. in case of parental control restrictions) and/or a credit card number (e.g. to purchase a VOD asset or a product), etc. Additionally, or in addition, E9 could be displayed using the similar techniques used for altering or masking the current content so that the first end user cannot see the source during the relevant timeslot.

FIG. 5C depicts a further exemplary mosaic presentation screen 131 corresponding to the mosaic presentation screen of FIG. 5B but at a later time. At this time:

E1-E2, E4-E6 and E10-E12 are still shown;

E8 is now shown because the first end user typically successfully entered his PIN code;

E9 is now shown because the current timeslot is allowed for viewing; and

E12 cannot be seen by the first end user for one the reasons discussed hereinabove.

FIG. 5D depicts a further exemplary mosaic presentation screen 131 based on attribute E and produced for a second end user. The mosaic presentation screen 131 includes the same cells E1-E9 and E12 as the ones depicted in FIG. 5A. However, E10 and E11 are missing. Using the signaling data restricting the use of the mosaic presentation screen, the video manager 250 may have instructed the compositor 270, for example, to not include:

E10 because the second end user was not identified as part of a second group of users allowed to view E10; and E11 because the second end user was located in a second region where E11 is not broadcasted and/or allowed for viewing.

Also, E6 and E8 are shaded to illustrate that the second end user cannot see the source for one of the reasons discussed hereinabove.

It is apparent from the exemplary embodiments of the present invention discussed hereinabove that the compositor 270 is operative to produce a wide range of mosaic presentation screens 131 for different end users or group of end users under the control of the video mosaic manager 250. Furthermore, an end user is able to input requests to client device 130. A request may be, for example, to change the cell currently in-focus, select a cell, or even to produce a mosaic presentation screen 131. The end user may use any suitable method or mechanism to input the requests. For example, a set-top box remote control may be used. In such a case, one or more buttons on the remote control may be programmed to send the requests. It will be appreciated that client device 130 may be configured to receive input from other input devices such as, for example, a companion device, a mouse, a pointing device, a mobile phone, a tablet computer, a keyboard or voice commands.

The end user is able to navigate within the produced mosaic presentation screen 131, that is to say to, changing the cell that currently has the focus. A visual indication is typically displayed to indicate which cell has the focus. When the cell currently having the focus is located on the far right, far left, far top or far bottom of the mosaic presentation screen 131 (the cells having attributes A or C and the top and bottom rows for the cells having attribute E in FIG. 3B for instance), a further input towards a direction outside of the displayed mosaic presentation screen 131 typically corresponds to a request for updating the mosaic presentation screen 131 or producing a new mosaic presentation screen 131. Indeed, depending on the implementation design, it may correspond to:

a simple navigation through a mosaic presentation screen 131 in which the cells are already decoded and ready to be displayed (e.g. moving down from one of the cells having attribute E in FIG. 3B); or a request to produce a new mosaic presentation screen where further video mosaic source services have to be processed (e.g. when moving left from one of the cells having attribute A, a new mosaic presentation screen 131 is produced since cells having attributes A may need to be displayed). In a situation where video decoding resources are not sufficient or available, a degraded version of the mosaic presentation screen 131 may temporarily be displayed (e.g. presenting less or lower quality cells).

Furthermore, when a cell is in-focus, extended information relevant to the current content may be displayed, automatically or after receiving a further input from the end user, using the received metadata and signaling data. Alternatively, or additionally, the end user may select the cell thereby triggering different actions depending on the nature of the current content or the source. Non-limiting examples of actions are given below:

if the cell corresponds to a linear TV service, client device 130 may display the selected linear TV service;

if the cell corresponds to a future program, client device 130 may: display further information relevant to the program; set a reminder; book a recording; etc.

if the cell corresponds to a VOD asset, client device 130 may enable the end user to purchase the VOD asset or play it; and if the cell corresponds to content accessible via a network address, client device 130 may access, display or play the content.

Figure 6:
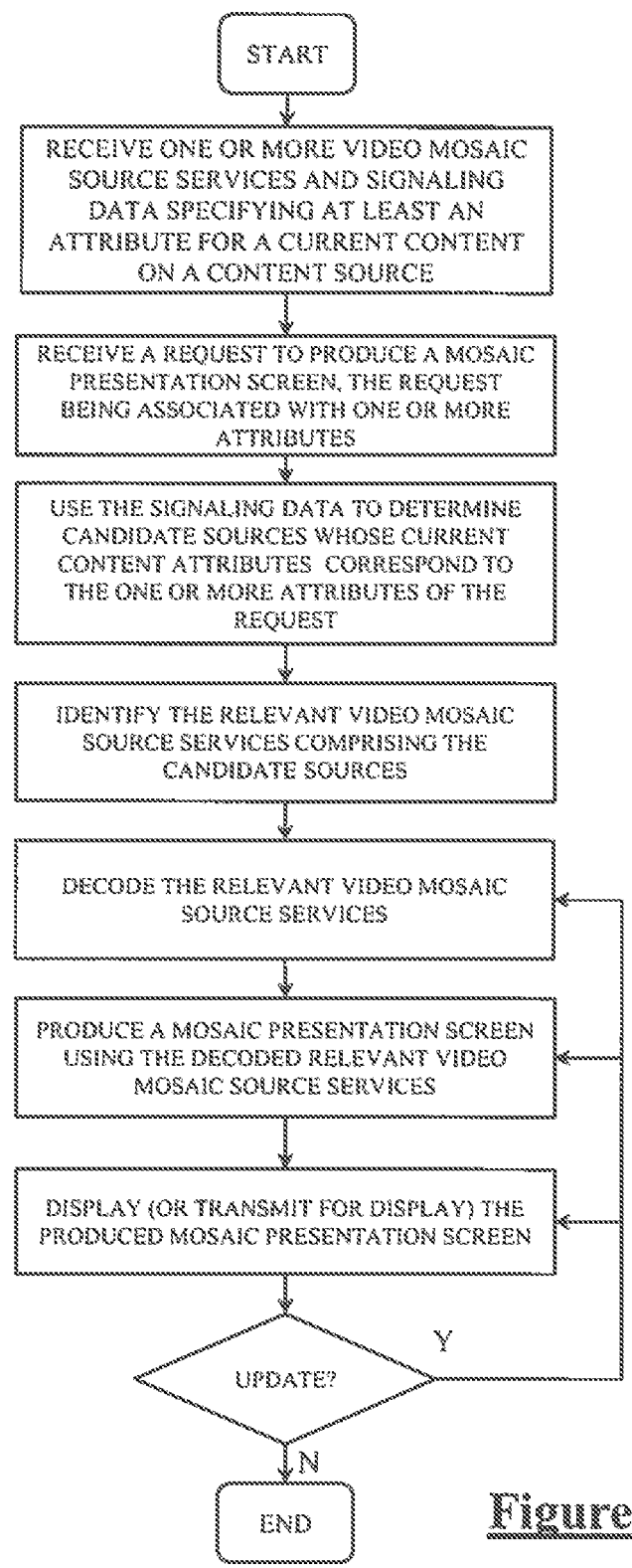
FIG. 6 is a simplified flow chart diagram of a method for producing and displaying a mosaic presentation screen in accordance with embodiments of the present invention.

Reference is now made to FIG. 6, which is a simplified flowchart of an exemplary method of operation of the client device. FIG. 6. is believed to be self-explanatory in light of the above discussion.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

Although the above embodiments have been described in the context of DVB implementation and using MPEG tables, someone skilled in the art will realize that other implementations are possible.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof.

What is claimed is:

1. A method implemented on a computing device, said method comprising:

receiving one or more video mosaic source services, each of said one or more video mosaic source services comprising a plurality of cells, each cell being associated with a content source;

receiving signaling data, said signaling data comprising at least one attribute defining a current content available on a content source;

receiving a request specifying an attribute to use for producing a mosaic presentation screen; and upon receiving said request, compositing cells extracted from said received one or more video mosaic source services into a mosaic presentation screen, said composited cells being associated with content sources whose current content attribute corresponds to said specified attribute, wherein said signaling data further comprises data specifying a location of a cell on a particular video mosaic source service for each content source; and said compositing further comprises:

identifying video mosaic source services comprising cells associated with content sources whose current content attribute corresponds to said specified attribute using said signaling data;

decoding said identified video mosaic source services;

identifying cells on said decoded video mosaic source services associated with content sources whose current content attribute corresponds to said specified attribute using said signaling data; and compositing said identified cells into a mosaic presentation screen.

2. The method of claim 1, further comprising dynamically removing a cell from said mosaic presentation screen upon detecting that the content source associated with said cell no longer has an attribute corresponding to said specified attribute.

3. The method of claim 2, wherein said dynamically removing comprises dynamically removing a cell from said mosaic presentation screen when a current content available on the content source finishes.

4. The method of claim 1, further comprising dynamically adding a further cell to said mosaic presentation screen upon detecting that a content source associated with said further cell has an attribute corresponding to said specified attribute.

5. The method of claim 4, wherein said dynamically adding comprises dynamically adding a further cell to said mosaic presentation screen when a new current content starts on a content source.

6. The method of claim 1, wherein said signaling data further comprises usage configuration data limiting the use of said mosaic presentation screen; and said compositing further comprises compositing cells extracted from said one or more video mosaic source services into a mosaic presentation screen, said composited cells being associated with content sources whose current content attribute corresponds to said specified attribute and being compliant with said usage configuration data.

7. The method of claim 6, wherein said usage configuration data comprises regional constraints and said compositing comprises compositing cells associated with content sources available in a particular region whose current content attribute corresponds to said specified attribute.

8. The method of claim 6, wherein said usage configuration data defines groups of users and said compositing comprises compositing cells associated with content sources relevant to a particular group of users whose current content attribute corresponds to said specified attribute.

9. The method of claim 6, wherein said compositing comprises including cells not compliant with said usage configuration data in said mosaic presentation screen and preventing an end user to view content sources associated with said non-compliant cells until a specific condition is met.

10. The method of claim 9, wherein an end user is prevented from viewing a content source until an end time of a timeslot is reached.

11. The method of claim 9, wherein an end user is prevented from viewing a content source until a personal identifier number is successfully entered.

12. The method of claim 9, wherein an end user is prevented from viewing a content source until said content source is subscribed to.

13. The method of claim 9, wherein an end user is prevented from viewing a content source until the display of commercials is accepted.

14. The method of claim 1, wherein said compositing is performed according to a predefined mosaic presentation screen composition, said predefined mosaic presentation screen composition defining further attributes associated with said specified attribute.

15. The method of claim 14, wherein said compositing comprises compositing into a mosaic presentation screen: cells associated with content sources whose current content attribute corresponds to said specified attribute; and further cells associated with content sources whose current content attributes corresponds to said further attributes, wherein cells associated with content sources having a same attribute are grouped together.

16. The method of claim 1, wherein said signaling data specifying a location of a cell on a particular video mosaic source service comprises spatial coordinates and a size of a cell; and said compositing said identifying cells further comprises extracting said cells from said video mosaic source services using said spatial coordinates and size.

17. The method of claim 1, further comprising associating a relevant audio stream with said mosaic presentation screen for later display to an end user.

18. A computing device comprising:
a service selector operable to receive one or more video mosaic source services, each of said one or more video mosaic source services comprising a plurality of cells, each cell being associated with a content source;
a configuration receiver operable to receive signaling data, said signaling data comprising: at least one attribute defining a current content available on a content source; and data specifying a location of a cell on a particular video mosaic source service for each content source;
a video mosaic service manager operable to receive a request specifying an attribute to use for producing a mosaic presentation screen; and
a compositor operable to:
composite cells extracted from said receiving one or more video mosaic source services into a mosaic presentation screen, said composited cells being associated with content sources whose current content attribute corresponds to said specified attribute;
identify video mosaic source services comprising cells associated with content sources whose current content attribute corresponds to said specified attribute using said signaling data;
decode said identified video mosaic source services;
identify cells on said decoded video mosaic source services associated with content sources whose current content attribute corresponds to said specified attribute using said signaling data; and
composite said identified cells into a mosaic presentation screen.

19. One or more computer readable non-transient tangible storage media encoded with software comprising computer executable instructions and when the software is executed operable to:
receive one or more video mosaic source services, each of the one or more video mosaic source services comprising a plurality of cells, each cell being associated with a content source;
receive signaling data, the signaling data comprising: at least one attribute defining a current content available on a content source; and data specifying a location of a cell on a particular video mosaic source service for each content source;
receive a request specifying an attribute to use for producing a mosaic presentation screen;
composite cells extracted from the received one or more video mosaic source services into a mosaic presentation screen, the composited cells being associated with content sources whose current content attribute corresponds to the specified attribute;
identify video mosaic source services comprising cells associated with content sources whose current content attribute corresponds to said specified attribute using said signaling data;
decode said identified video mosaic source services;
identify cells on said decoded video mosaic source services associated with content sources whose current content attribute corresponds to said specified attribute using said signaling data; and
composite said identified cells into a mosaic presentation screen.

\* \* \* \* \*